United States Patent [19]

Hipp, deceased et al.

[11] 4,084,007

[45] Apr. 11, 1978

[54] METHOD OF PRODUCING EDIBLE MEAL FROM COTTONSEED

[75] Inventors: James P. Hipp, deceased, late of Tulia, Tex., by Gretta Hipp, administratrix; Carter Foster, Jr., Temple, Tex.

[73] Assignee: Carpat International Inc., Tulia, Tex.

[21] Appl. No.: 714,593

[22] Filed: Aug. 16, 1976

Related U.S. Application Data

[63] Continuation-in-part of Ser. No. 446,638, Feb. 28, 1974, abandoned.

[51] Int. Cl.$^2$ .............................................. A23L 1/36
[52] U.S. Cl. .................................... 426/430; 426/478; 426/507
[58] Field of Search ............... 426/629, 634, 430, 489, 426/507, 521, 478, 489; 260/412.2, 412.3

[56] References Cited

U.S. PATENT DOCUMENTS

| | | | |
|---|---|---|---|
| 2,615,808 | 10/1952 | Rice | 426/430 X |
| 2,629,722 | 2/1953 | Dunning | 260/412.4 |
| 2,873,190 | 2/1959 | King | 426/430 |
| 3,585,049 | 6/1971 | Galle | 426/521 |
| 3,615,657 | 10/1971 | Gastrock et al. | 426/430 |

OTHER PUBLICATIONS

King, W. H., "Drying Moist Cottonseed Prot. Prod.," J.A.O.C.S., vol. 46, pp. 184A, 186A, 188A, 190A.

Primary Examiner—Raymond N. Jones
Assistant Examiner—R. A. Yoncoskie
Attorney, Agent, or Firm—Fishburn, Gold & Litman

[57] ABSTRACT

An improved process for producing a high quality, edible meal product from cottonseed by releasing oil under conditions whereby unruptured gossypol cells are floated out with the oil flow and immediately separated from the remaining solids. Sufficient gossypol is removed in the cooking step of the extraction phase by a simple, low temperature heat and moisture treatment so that the final meal product rendered is safe and nutritious for human consumption, yet produced at lower cost than prior art methods. The dry, decortiated oleaginous material is treated in a flow down cooker where heat and moisture are added for removal of a significant portion of the oil and gossypol therein, after which the material is mixed with a solvent for removal of the major portion of the remaining oil and gossypol. The material is then separated from the mixture of solvent and removed oil and gossypol in an extracting or washing apparatus after which the material is treated in a desolventizer for removal of the remaining solvent, leaving a meal with a low gossypol and fat content.

15 Claims, 2 Drawing Figures

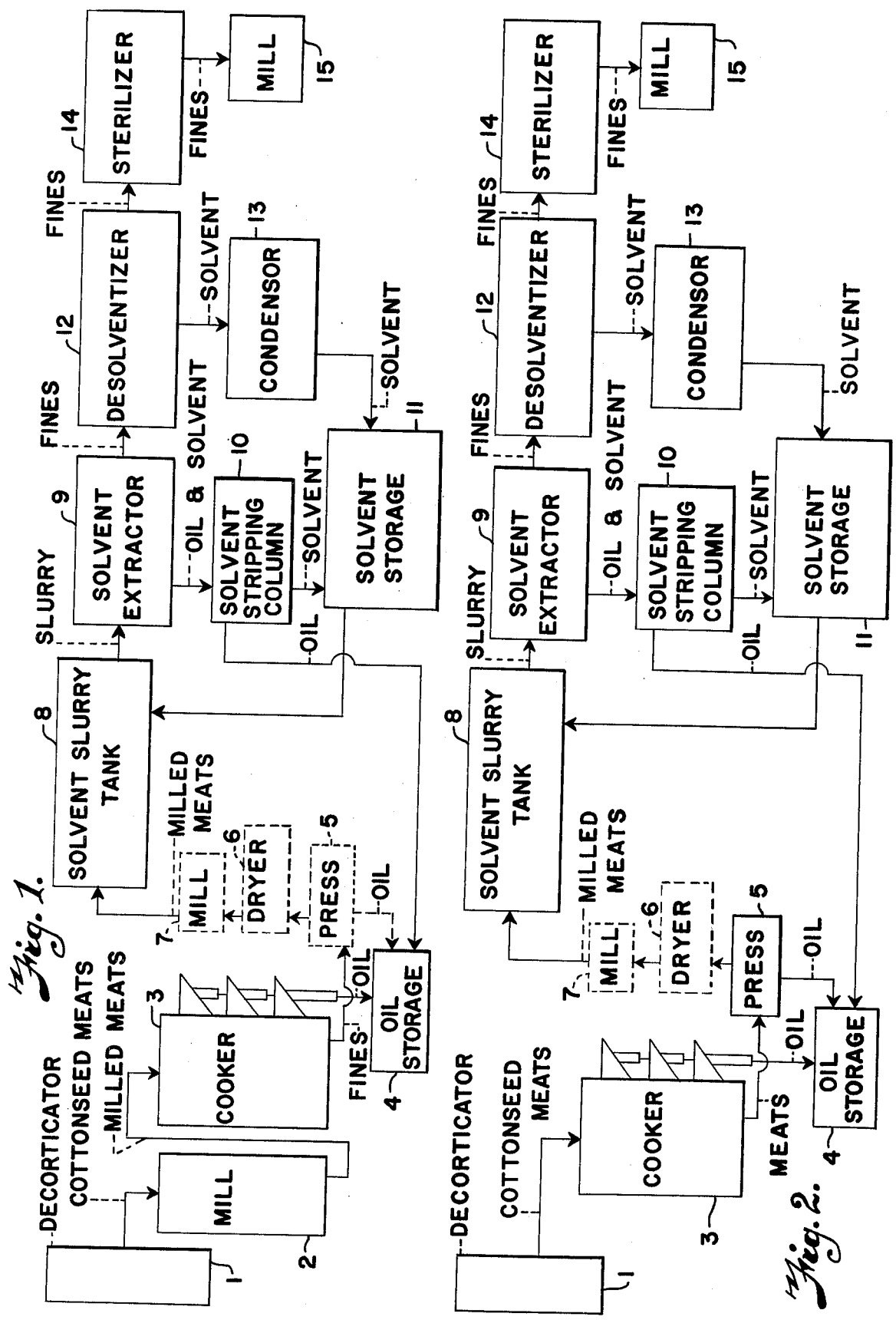

METHOD OF PRODUCING EDIBLE MEAL FROM COTTONSEED

This is a continuation-in-part application of pending application Ser. No. 446,638 filed Feb. 28, 1974, now abandoned.

The present invention relates to the removal of oil with the gossypol from cottonseed and more particularly to a method or process for the production of meal fit for human or non-ruminant animal consumption from gossypol containing cottonseed. In the past, processes for removing gossypol from cottonseed to produce edible meal suitable for humans, chickens, swine, etc., encountered problems such as removal of insufficient quantities of gossypol, excessive degradation of the protein fraction, low grade meal and high cost of production.

It is known that cottonseed has high nutritional value, but contains gossypol that renders the products therefrom unfit for non-ruminant animal and human consumption. In the past, cottonseed, in spite of its high food value, has found little use except for its oil, which can easily be made gossypol free by conventional methods, and in its use as a feed product for ruminants which are not seriously affected by the gossypol content.

The principal objects of the present invention are: to provide a process for separating oil and gossypol from cottonseed meats in an inexpensive manner for producing nutritious meal products fit for human and animal consumption; to provide such a process which releases the oil in the cooking step of the extraction phase and causes unruptured gossypol cells to be efficiently floated out therewith; to provide such a process which is continuous in removing oil and gossypol from oleaginous vegetable substances; to provide such a process that will not appreciably destroy or degrade the protein fraction, thereby maintaining a high nutritional value in the resulting meal; to provide such a process that may be performed in a substantially enclosed space to reduce pollution problems and eliminate loss of reusable materials; to provide such a process which may be used as an inexpensive step for the production of gossypol fractions, to provide such a process which is easily and inexpensively performed and well adapted for its intended purpose; and to provide such a process which requires a minimum of energy and is adaptable to be performed with many existing installations.

Other objects and advantages of the present invention will become apparent from the following description wherein are set forth by way of example certain embodiments of the present invention.

FIG. 1 is a diagrammatic flow diagram of one embodiment of this invention.

FIG. 2 is a diagrammatic flow diagram of a modified embodiment of this invention.

Gossypol has been defined chemically as 1,1', 6,6', 7,7'-Hexahydroxy-3,3'-dimethyl-5,5'-diisopropyl-2,2'-binaphthyl-8,8'-dialdehyde; 2,2'-bis[1,6,7-trihydroxy-3-methyl-5-isopropyl-8-aldehydonaphthyl]; 2,2'-bis[8-formyl-1,6,7-trihydroxy-5-isopropyl-3-methylnaphthyl].
The chemical formula is given as $C_{30}H_{30}O_8$, with the following structural arrangement:

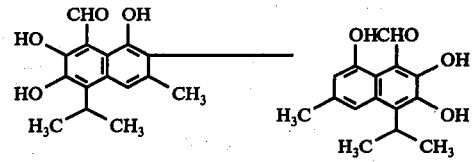

Gossypol is generally considered to have three crystalline modifications, each having a different melting point, approximately 184° C, 199° C and 214° C. The compound is known to be toxic or poisonous to humans, more specifically, irritating to the gastrointestinal tract. By experiment it has been shown to cause edema of lungs, shortness of breath and paralysis in non-ruminant animals given large doses.

Gossypol is contained in glands or cells that are dispersed throughout the internal nut meal of cottonseed. The F.D.A. has set a limit of 0.045% of free gossypol in human food products. When gossypol is referred to herein, it is taken to mean free gossypol, since bound gossypol has a higher tolerance level in non-ruminants, but is still considered undesirable, particularly in human food.

In practicing this invention, and with reference to the drawings, oleaginous vegetable substances such as cottonseed, are conditioned by treatment with relatively low temperature moisture for removal, in the cooker, of significant portions of the oil and gossypol contained therein, after which the solid materials may be treated in a solvent bath for removal of a major portion of the residual oil and gossypol. The remaining solid materials, after extraction of residual solvents are, preferably, then sterilized after which they are ground to the desired consistency, and air classified to remove fiberous material, producing a low fat meal edible by humans as well as animals. The extracted oil and gossypol mixture, which is a byproduct of the process herein, may be refined to eliminate the gossypol in the oil thereby making it also safe for human or general animal consumption.

More particularly, cottonseed is desirably decorticated in a conventional decorticator 1 and the hulls and the meats separated, all by known methods. The meats may be rolled or ground in a mill 2 such as a roller or hammer mill initially to a thickness of approximately 0.005 to 0.012 inches and sent dry, that is, without prior moisture addition (natural moisture around 6–8%) to an atmosphere vented cooker-conditioner 3, preferably of the stack flow down type having several rings. In the cooker-conditioner, gentle agitation with relatively short time moisture and low temperature treatment cause gossypol cells to float out of the meats, with minimal rupturing, together with oil flow, and the extracted mixture is continually separated from the meats at this point. Thus, a significant proportion of the gossypol and oil (40% to 60%) is removed from contact with the raw meats at this early stage in processing, the oil being used as a vehicle for floating out generally unruptured gossypol cells, drastically reducing the chances of the gossypol spreading and becoming chemically and physically bound into the remaining solid materials, from which it is more expensive and difficult to remove. Further, the cooking step, which is common to many known processes for oil extraction from seeds, is here used for the dual purpose of (1) treating for improved oil and gossypol removal and, in large measure, (2) the actual removal thereof, and in addition, without significantly denaturing or damaging the nutritive value of the remaining protein. Preferably, the conditioner 3 is of the type having perforated sides and bottoms to facilitate the early and rapid drainage of the oil and gossypol mixture therefrom.

As an alternative to prior milling, the meats may be sent relatively whole to the conditioner 3, which will usually require some modification in the treatment, as discussed in more detail below.

The dry meats are introduced into the cooker-conditioner 3 where the moisture and heat are added until the oil and gossypol begin flowing from the drain. The moisture content of the meats is adjusted in the first ring of the cooker-conditioner to between fourteen percent and thirty percent (14% to 30%) by weight and preferably fifteen to twenty percent (15% to 20%) while the temperature of the meats is increased from ambient to approximately 140° F to 170° F. The moisture addition is created by exposure of the meats to a relatively low temperature, high humidity environment within the cooker-conditioner. The meats are retained in the cooker-conditioner for a time period of approximately 20 to 50 minutes, depending upon the size and characteristics of the meats during which they are gently agitated by an agitator rotating at a speed of approximately 30 to 70 r.p.m. The increased humidity, temperature and agitation of the meats induces oil mixed with gossypol and other undesirable materials to be released from the meats and to flow off or separate therefrom. The moisture content of the meats is reduced from the induced level of 14 to 30 percent to approximately 10 percent by weight during flow down through the vented cooker-conditioner. The released oil, gossypol and other normally undesirables are immediately separated from the meats and preferably conducted to an oil storage facility 4, such as an enclosed screening tank, for later processing and the remaining solids or meats are conducted to other apparatus for the next steps of the process. The amount of oil released from the meats in the cooker-conditioner 3 is dependent on the temperature, speed of agitation, moisture content of the material, the retention time and the initial condition of the meats.

In the preferred practice of this invention, the meats are ground or rolled to fines before entering the cooker-conditioner 3. An alternate procedure may be used as seen in FIG. 2, wherein the relatively whole, decorticated meats are conveyed into the cooker-conditioner 3 for the noted extraction. Following the separation, the meats may be directed to apparatus 5, such as a screw press, for lightly pressing the processed meats to a desired consistency. It is to be noted that, if desired, the screw press 5 may also be used in the process illustrated in FIG. 1. During pressing of the cottonseed meats a certain amount of additional oil and gossypol is released which may be returned to the oil storage facility 4 where it is screened and stored for later processing.

The meats from the cooker-conditioner, and/or the press, hereinafter called pre-extracted meats, are conveyed to apparatus for mixing and intimate contact with a suitable solvent, however, alternate processing operations can be provided before contact with the solvent. A vacuum type dryer 6 may be used to reduce and/or control the moisture content of the pre-extracted meats so that same will more readily absorb solvent. Also, a mill 7, such as a cracking roll or hammer mill, can be provided to adjust the size or consistency of the pre-extracted meats from the dryer 6, however, it is to be noted that the dryer 6 and mill 7 may be used with or without use of the press 5.

Preferably, the apparatus includes a solvent bath or slurry tank 8 which is agitated and contains a suitable organic solvent such as ethyl alcohol, or acetone preferably in combination with water or combinations of the solvents with water wherein the pre-extracted meats are mixed with for intimate contact therewith, forming a slurry. In preferred examples, the solvent includes acetone in the range of approximately 10% to 50% by weight of total solvent, ethyl alcohol in the range of approximately 50% to 90% and water in the range of 0.5% to 5.0%, the smaller the particle, the greater the proportion of water.

From the slurry tank 8 the pre-extracted meats and solvents, now called slurried meats, are conveyed to suitable means 9 such as either a basket extractor or a vacuum wash filter wherein the slurried meats are washed to separate or extract the oil and gossypol therefrom. The period of time in the extractor 9 is approximately 40 to 100 minutes if the meats are rolled or ground before being placed in the cooker-conditioner 3 and approximately 40 to 180 minutes if whole meats are placed in the cooker-conditioner. For economy, an initial washing may utilize miscella, a mixture of extracted gossypol bearing oil and solvent, then washed with fresh solvent to extract or release the major remaining portion of oil and gossypol from the slurried meats. The residual oil content in the slurried meats should be approximately 1 percent to 1½ percent by weight after washing in the basket extractor or vacuum wash filter. The retention time of the slurried meats in the basket extractor or vacuum wash filter is approximately 40 to 100 minutes (40 to 180 for whole meats) with the temperature approximately 110° F. to 130° F. The basket extractor or vacuum wash filter can be of a generally standard type of construction.

The miscella from the basket extractor or vacuum wash filter is passed through a vacuum or solvent stripping column 10 where the extracted oil and gossypol are separated from the solvent in a conventional manner, and the oil and gossypol mixture is conducted to the oil storage facility 4 that stores the oil and gossypol extracted in the prior steps of the process. The solvent that is stripped from the oil and gossypol mixture is returned to a solvent storage facility 11 and can be re-used in the solvent extraction step of the process.

The extracted meats and the residual solvent mixture are conducted to a suitable desolventizer 12 such as a Schencken type desolventizer with vacuum seal for removal or extraction of the solvent from the extracted meats. Preferably, the temperature in the desolventizer 12 will be approximately 145° F. to a maximum of about 170° F. with the vacuum in the range of 15 to 20 inches of mercury. Retention time in the desolventizer 12 will be approximately 15 to 20 minutes. The desolventized, extracted meats are then removed from the desolventizer and are ready for the next step, solvent extracted generally being conducted to a condenser 13 or other apparatus for reclamation and return to the solvent storage tank for reuse.

The next step of the process preferably is to sterilize the desolventized meats in a sterilizer 14 so that they will pass appropriate F.D.A. food specifications. One method of sterilizing the desolventized meats is to pass them through a second Schencken type desolventizer with an exposure to a temperature of approximately 180° F. to 190° F. and a vacuum of approximately 15 to 20 inches of mercury with a retention time in the second Schencken type sterilizer being approximately 5 to 20 minutes.

The sterilized, extracted meats are then removed from the sterilizing apparatus and can be reground in a mill 15 to a consistency as desired to facilitate air classification. The reground, extracted meats may be air classified whereby the fiber content is substantially separated from higher protein content materials; the fiber being used for animal food with the remaining higher protein material with low gossypol content being reground to a flour-like consistency and packaged in a manner suitable for human consumption.

The extracted oil and gossypol mixture may contain other undesirable materials, in addition to gossypol, released in the process and can be refined by conventional caustic methods wherein the gossypol is destroyed and the oil is purified suitably for human consumption. The impurities contained in the oil/gossypol mixture before refining may be contained, for example, in soapstocks produced by the caustic refining.. refining. the alternative, the gossypol may be separated from the oil-gossypol mixture for pharmaceutical uses, the described method of extraction from the cottonseed meats then providing an additional advantage as an inexpensive step for this purpose.

The above described process is preferably continuous and may also be carried out in a completely enclosed system with the exception of vents to relieve pressure in the cooker-conditioner 3. There is a minimum of waste discharges presenting waste disposition or air pollution problems.

By way of specific example, cottonseed meats, without prior moisture treatment, were passed through a mill to obtain a thickness of 0.005 inches. These meats, still dry, were introduced into a flow down type cooker-conditioner where, in the first ring, the meats were adjusted to a moisture content of 16.45% by weight and heated to a temperature of 160° F. for 40 minutes while being agitated at 50 RPM in a high humidity environment. The released oil with entrained gossypol cells were drained away during the treatment and the remaining meats or fines, then reduced to around 10% moisture, were placed in a press to extract somewhat more of the remaining oil and gossypol. The oil and gossypol released from the pressing step was retained and stored with the oil and gossypol obtained in the cooking step. The press cake of the residual meats was immediately placed into a vessel containing a solvent composed of 1½% water, 42% acetone, and 56½% ethyl alcohol with the solvent being agitated to percolate through the pressed cake. The cake was desolventized and the mixture of solvent, oil and gossypol processed to extract the solvent from the oil/gossypol mixture. The oil and gossypol obtained from the desolventizing step of the process was placed in storage with the oil obtained from the prior steps in the process. The residual cottonseed meats were then desolventized and tested for gossypol showing the remaining free gossypol being in quantity of 0.018% by weight.

It is to be understood that while we have described certain processes of our invention, it is not to be limited to these specific processes disclosed herein.

We claim:

1. A process for producing edible meal from cottonseed comprising the steps of:
   (a) introducing dry, raw cottonseed meats into a cooker;
   (b) subjecting said meats in said cooker to mild agitation at a temperature range between about 140° F to 170° F under high humidity conditions for a period of time sufficient to raise the moisture content of said meats to a range of about 14% to 30% by weight of said meats, thereby creating conditions for the release of oil and unruptured gossypol cells from said meats;
   (c) continuing said agitation at said temperature range for a period of approximately 20 to 50 minutes, whereby said oil and said unruptured gossypol cells are released from said raw meats along with moisture and form an admixture therewith; and
   (d) flowing off said admixture from said meats so as to substantially reduce the moisture content of said meats below the level attained during said agitation under high humidity conditions whereby said meats have a reduced oil and gossypol cell content.

2. The process as set forth in claim 1 wherein:
   (a) said cottonseed meats are milled prior to introduction into said cooker.

3. The process as set forth in claim 1 wherein:
   (a) said cottonseed meats are relatively whole upon introduction into said cooker.

4. The process as set forth in claim 1 wherein:
   (a) said cottonseed meats contain about 6% to 8% moisture upon introduction into said cooker.

5. The process as set forth in claim 1 wherein:
   (a) said cooker is a multi-ring flow down cooker and;
   (b) said high humidity conditions are introduced primarily in the top ring of said cooker.

6. The process as set forth in claim 1 wherein:
   (a) said cooker is vented to the atmosphere.

7. The process as set forth in claim 1 wherein:
   (a) said agitation results from the rotation of an agitator revolving at a speed of approximately 30 to 70 revolutions per minute.

8. The process as set forth in claim 1 wherein:
   (a) said step of removing oil and gossypol occurs continuously during said period.

9. The process as set forth in claim 1, further including the steps of:
   (a) removing said meats having reduced oil and gossypol cell content from said cooker;
   (b) forming a slurry with said meats and an organic solvent selected from the group consisting of ethyl alcohol and acetone and mixtures thereof, thereby extracting residual oil and gossypol from said meats and producing slurried meats;
   (c) separating said slurried meats from the liquid portion of said slurry; and
   (d) stripping residual organic solvent from said slurried meats, producing desolventized, oil-extracted meats having a free gossypol content of less than 0.045% by weight.

10. The process as set forth in claim 9 including the step of:
    (a) sterilizing said desolventized meats.

11. A process as set forth in claim 9 wherein:
    (a) said organic solvent includes approximately 50% to 90% by weight of ethyl alcohol and approximately 10% to 50% by weight of acetone and approximately 0.5% to 5% by weight of water.

12. A process as set forth in claim 9 wherein:
    (a) said stripping residual organic solvent occurs during a period of approximately 15 to 20 minutes and under a vacuum of approximately 15 to 20 inches of mercury and at a maximum temperature of approximately 170° F.

13. A process as set forth in claim 10 wherein:
(a) said sterilizing is accomplished by increasing the temperature of said desolventized meats to approximately 180° F. under a vacuum of approximately 15 to 20 inches of mercury for approximately 5 to 20 minutes.

14. The process as set forth in claim 1 wherein:
(a) said moisture content of said meats after said flowing off is approximately 10% by weight.

15. The process as set forth in claim 9 including the steps of:
(a) pressing said meats having reduced oil and gossypol cell content before forming said slurry, thereby removing additional said admixture.

* * * * *